United States Patent [19]
Campbell

[11] Patent Number: 5,790,399
[45] Date of Patent: Aug. 4, 1998

[54] ELECTRICAL LOAD MANAGEMENT METHOD AND APPARATUS FOR A VESSEL

[75] Inventor: David James Campbell, Maple Ridge, Canada

[73] Assignee: Ocean Electro Systems Ltd., Vancouver, Canada

[21] Appl. No.: 590,285

[22] Filed: Jan. 23, 1996

[51] Int. Cl.⁶ .................................................. G05B 11/01
[52] U.S. Cl. .................. 364/140; 364/481; 364/483; 364/492; 307/18; 307/29; 307/38; 307/43; 361/42
[58] Field of Search .................. 364/140, 492, 364/481, 483; 307/19, 43, 18, 29, 37, 31, 38, 39; 361/42

[56] References Cited

U.S. PATENT DOCUMENTS

| | | | |
|---|---|---|---|
| 3,591,847 | 7/1971 | Donnell et al. | 307/37 |
| 3,965,366 | 6/1976 | Sumida et al. | 307/39 |
| 4,245,140 | 1/1981 | Jencks et al. | 200/400 |
| 4,321,645 | 3/1982 | Thom et al. | 307/19 |
| 4,356,402 | 10/1982 | Morimoto et al. | 307/19 |
| 4,403,292 | 9/1983 | Ejzak et al. | 364/492 |
| 4,964,058 | 10/1990 | Brown, Jr. | 364/492 |
| 4,967,096 | 10/1990 | Diemer et al. | 307/19 |
| 5,323,307 | 6/1994 | Wolf et al. | 364/140 |
| 5,583,419 | 12/1996 | Haller | 364/492 |
| 5,612,579 | 3/1997 | Wisbey et al. | 307/18 |

*Primary Examiner*—James P. Trammell
*Assistant Examiner*—Hien Vo
*Attorney, Agent, or Firm*—John Russell Uren

[57] ABSTRACT

A control system for a vessel utilizes a first and second power source to supply a first and second electrical load on the vessel. Each of the power sources is connected to its particular load and motorized circuit breakers are provided to allow operation of both the loads with a single power source, conveniently a generator, and to allow connection of each individual load to its own power source and to isolate the two loads and two power sources if both power sources are being used simultaneously.

8 Claims, 6 Drawing Sheets

ELECTRICAL LOAD MANAGEMENT METHOD AND APPARATUS FOR A VESSEL

INTRODUCTION

This invention relates to a load management method and apparatus for performing such method and, more particularly, to a load management system for distributing electrical loads between power sources in a vessel.

BACKGROUND OF THE INVENTION

In boats or vessels of the larger type, in the range of seventy (70) feet to one-hundred-fifty (150) feet, the engine room is isolated from the wheel house by a fairly reasonable distance and the electrical requirements are relatively high. In such vessels, typically two or more generators are used to supply the electrical power for the vessel. Each generator is located in the engine room and each is connected to a prime mover or engine, typically an engine for each generator. The electrical load of the vessel is distributed between the two generators depending on power requirements. If the loading is not high, only one generator may be used and, of course, when the vessel is at shore and shore power is available, neither generator need be used and the electrical load of the vessel will be supplied by shore power coupled directly to service the load.

Typically, a manual type load control has been used. This technique comprises transfer switches and control breakers located in the engine room separate from the wheel house. In order to properly distribute the load to the generators, the transfer switches were manually operated to connect the load to the generators in an appropriate fashion. The operation of the generator would be initiated in the wheel house by a first operator. Once the generator was operating, it was necessary to manually operate the transfer switches in the engine room to transfer the load to the generator. Subsequently, if additional power was necessary, the same procedure was used; that is, the operation of a second generator was initiated from the wheel house and, thereafter, the second generator was connected to the load again by manually operating a second transfer switch. This is time consuming and inconvenient.

If it is desired to control the electrical loading and generator operation from the wheel house rather than the engine room, it is possible to locate the transfer switches in the wheel house. However, such a location for the transfer switches mandates a large cable running from the wheel house to the engine room where the generators are located. This is costly, unsightly and the cable is obtrusive. Further, the transfer switches still must be manually operated.

In such prior art systems, circuit breakers must be used to prevent overload on the generators. The circuit breakers are controlled by electrical contactors. Electrical contactors are similar in operation to solenoids wherein a coil is used to create a magnetic field which brings two conductive members into or out of contact with each other and which thereby allows power to flow or be interrupted. The use of such contactors, however, is a problem in many applications where a coil may fail. If the contactor opens, power will be interrupted between the load and the generator. If the power to the load is interrupted because of such malfunction, it is difficult to remedy the difficulty without replacing the contactor which may be inconvenient to do while away from shore. The contacts of the electrical contactor may be physically forced together to allow power to flow but the potential for damage to the generator and for safety concerns is clear. Further, the necessity for a circuit breaker in addition to the contactor is required.

SUMMARY OF THE INVENTION

According to one aspect of the invention, there is provided a vessel load management system comprising a control panel, a first and a second electrical load, a first and second generator operable to supply power to said first and second loads, first and second motorized circuit breakers interposed between said control panel and said first and second generators and a third motorized circuit breaker operably interposed between said first and second loads, said third motorized circuit breaker being operable to isolate said first generator supplying power to said first load and said second generator supplying power to said second load.

According to a further aspect of the invention, there is provided a method of managing the electrical load of a vessel comprising providing power to a first and second load from a first and second power source, controlling the distribution of said first and second loads to said first and second power sources and isolating said first and second loads when said power is being provided to said first and second loads simultaneously by said first and second power sources.

BRIEF DESCRIPTION OF THE SEVERAL VIEWS OF THE DRAWINGS

Specific embodiments of the invention will now be described, by way of example only, with the use of drawings in which.

DESCRIPTION OF SPECIFIC EMBODIMENT

Figure 1:
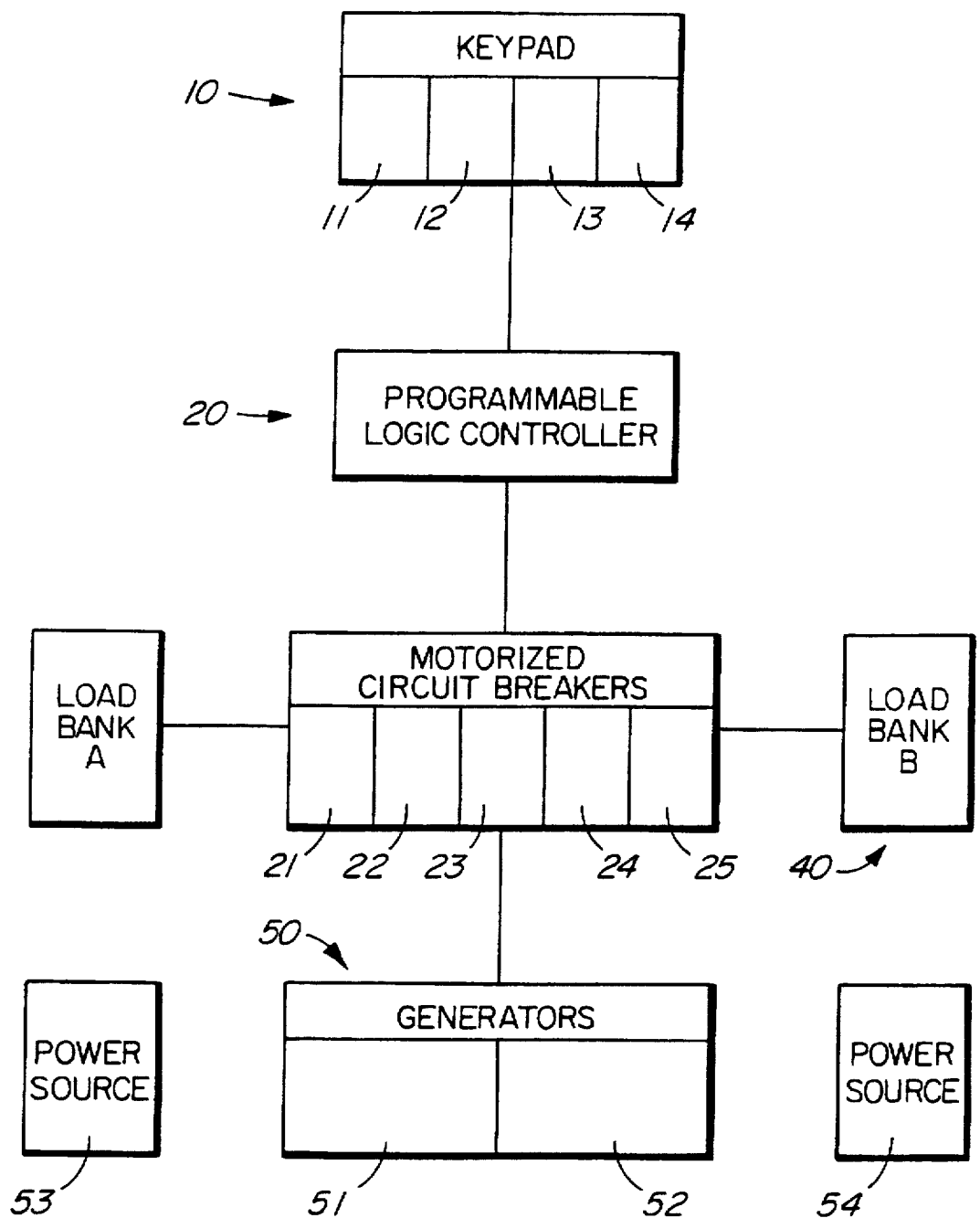
FIG. 1 is a diagrammatic overview of the various operating components used in the load management system according to the present invention.

Referring now to the drawings, a keypad or control panel is generally illustrated at 10 which is located in the wheelhouse of a vessel. It comprises a plurality of keys or control buttons 11, 12, 13, 14 which are individually operated by the operator. It will be assumed that the vessel described herein has two generators and two load circuits which are connected to the generators either separately or, if both generators are operating, separately. In such event, control button 11 will be a shore power control button, conveniently named port shore control button 12 will be a button controlling the first generator, conveniently named port generator control 12, control button 13 will be a second shore power control button, conveniently named starboard shore control 13 and control button 14 will be a button controlling the second generator, conveniently named starboard generator control 14.

Each of the control buttons 11, 12, 13, 14 is connected to a programmable logic controller illustrated generally at 20 in FIG. 1. The programmable logic controller controls the distribution of the control signals to a bank of five (5) motorized circuit breakers 21, 22, 23, 24, 25, the bank generally being illustrated at 30. Four (4) of the five motorized circuit breakers 21, 22, 24, 25 are associated with a respective control button, thereby being port shore breaker 21, port generator breaker 22, starboard shore breaker 24 and starboard generator breaker 25. The fifth circuit breaker 23 is a tie breaker used to isolate or join the two electrical loads as will be described in greater detail.

Figure 5:
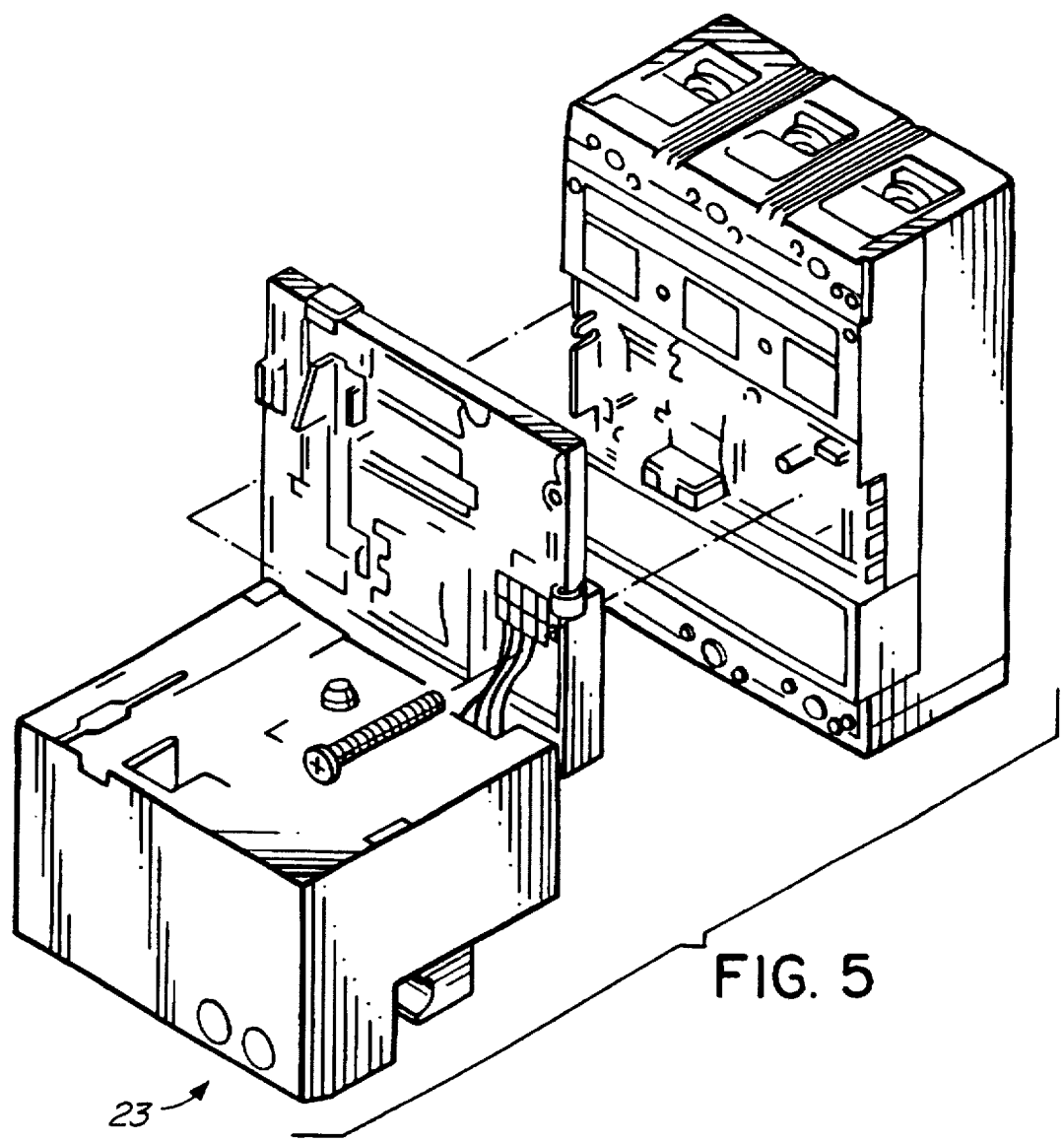
FIG. 5 illustrates a motorized circuit breaker with a spring energizer.

FIG. 5 illustrates a typical motorized circuit breaker 23. This breaker 23, however, is of the preloaded spring energizer variety. This type of breaker is used when more heavy amperage requirements are present, conveniently over 150 amps although it could certainly be used with smaller power requirements. Otherwise, the spring is conveniently absent in motorized breakers according to the present invention.

Figure 2:
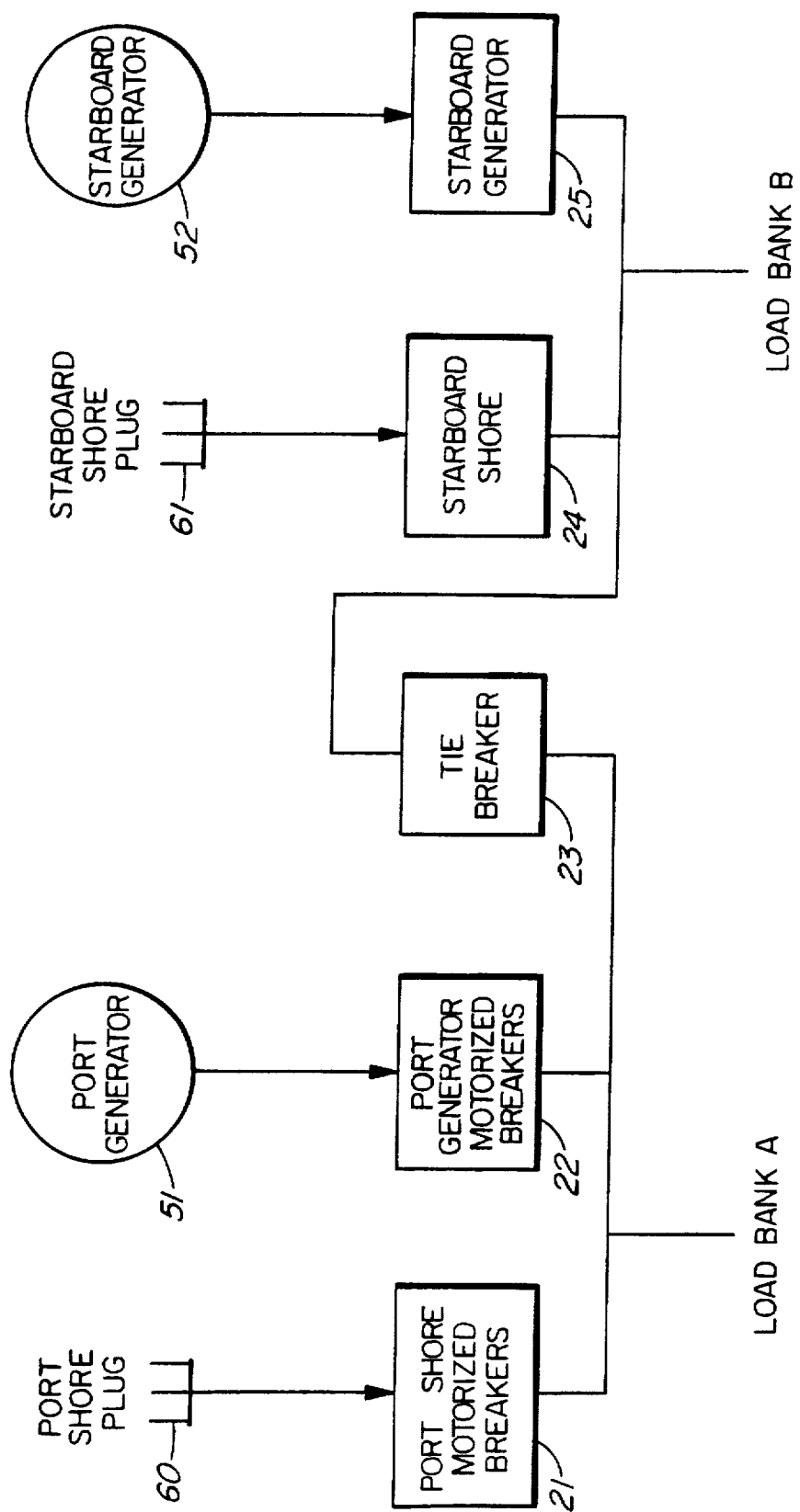
FIG. 2 is a diagrammatic view of the two electrical loads of the vessel and the interconnection between the loads and the power sources, including the motorized circuit breakers.

The bank of motorized circuit breakers 30 is interposed between the load 40 and the power sources generally illustrated at 50. The power sources include the port and starboard generators 51, 52, respectively and the port and starboard shore power sources 53, 54, respectively, which are joined to the ship electrical load through couplers or plugs 60, 61 (FIG. 2), plug 60 being conveniently referred to as port plug 60 and plug 61 being conveniently referred to as starboard plug 61.

Figure 3A:
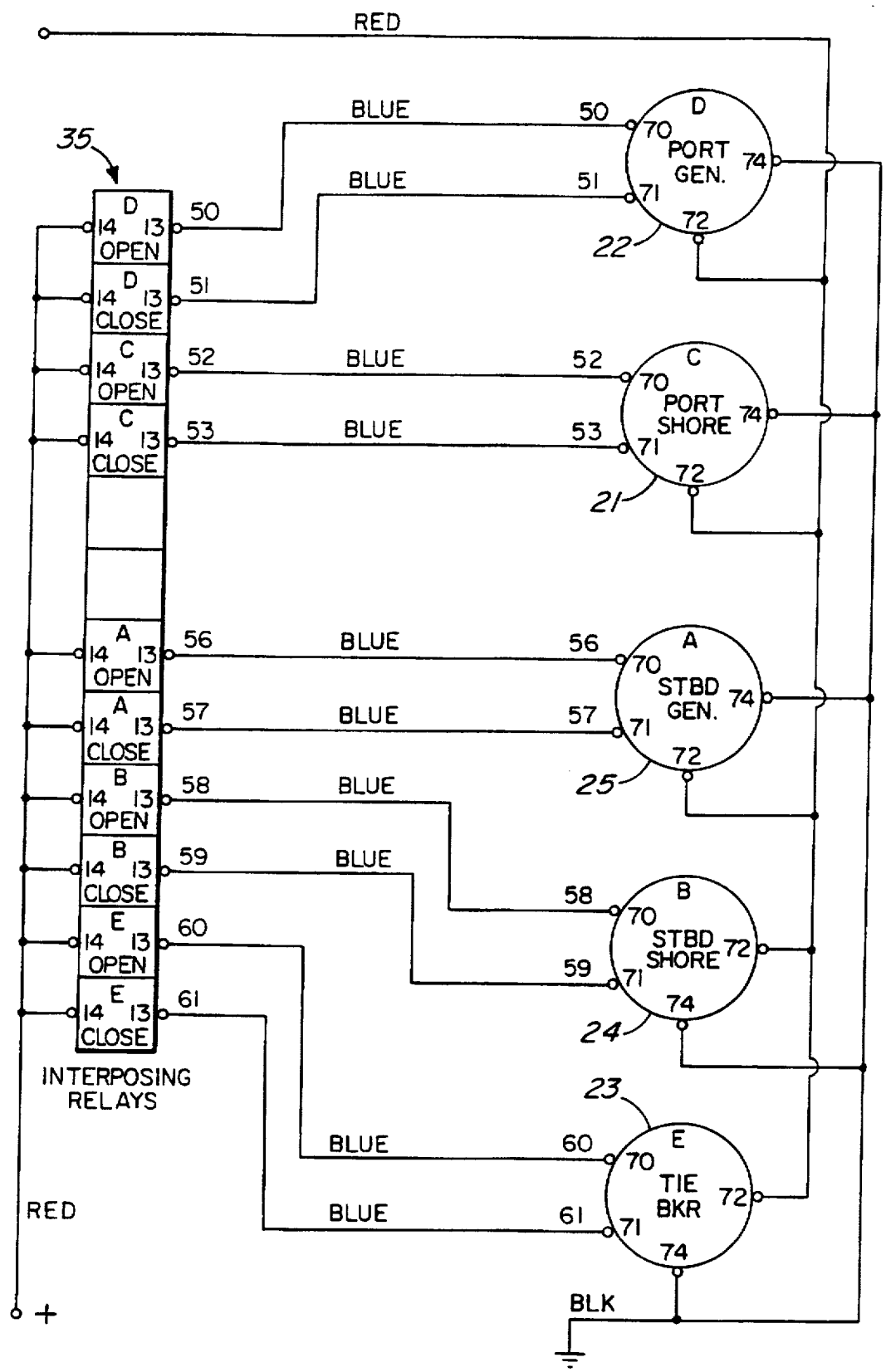
FIGS. 3A and 3B are schematic views of the programmable logic control used with the load management system of FIG. 1 and illustrating the associated electrical safety interlocks.
Figure 3B:
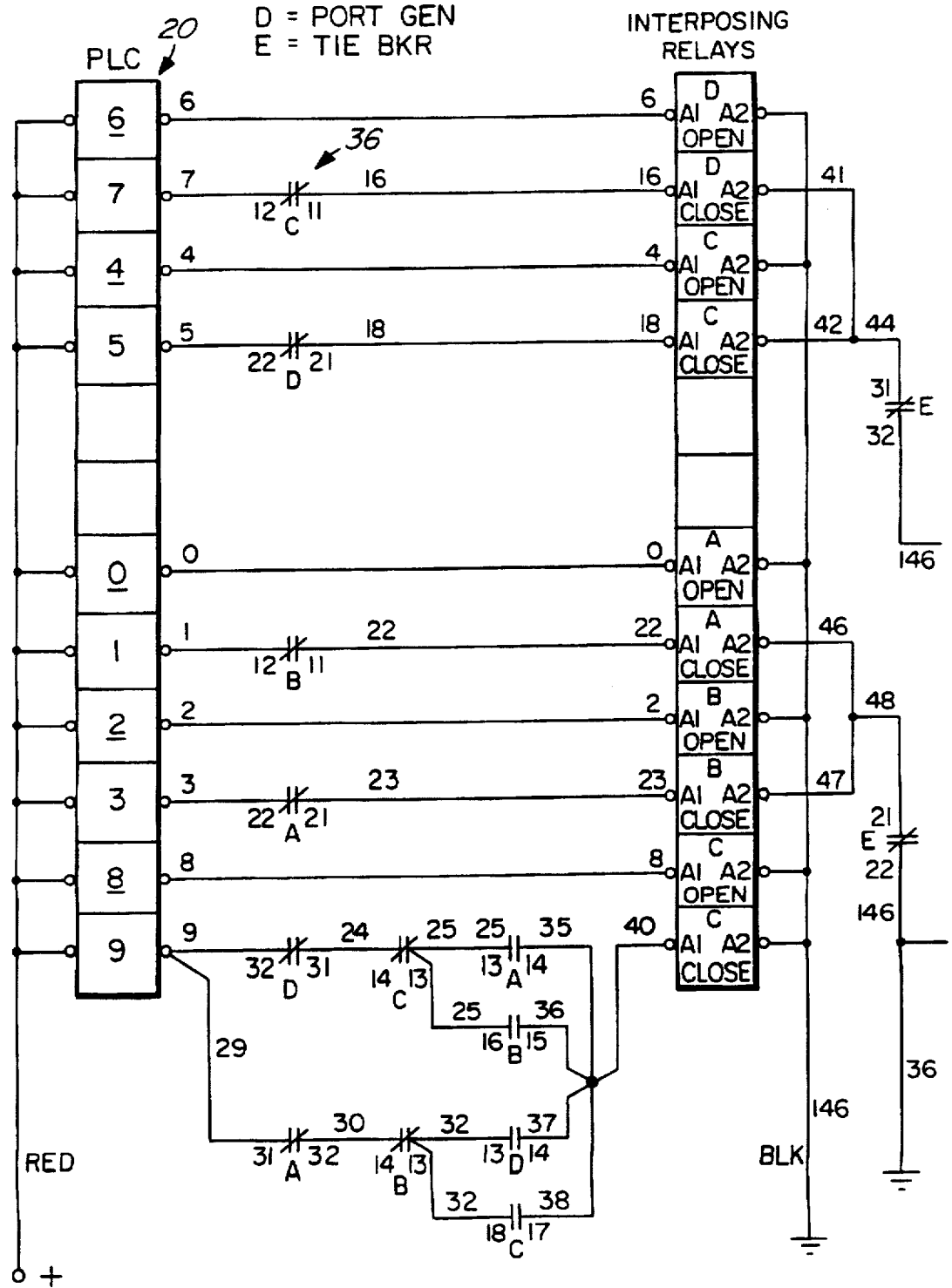
Figure 4:
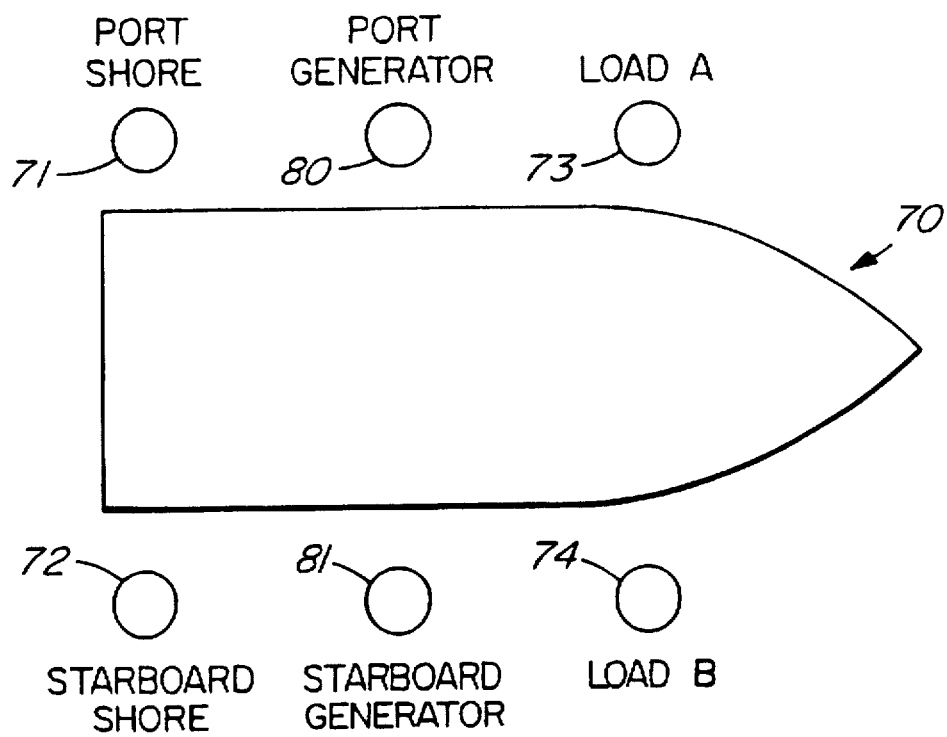
FIG. 4 is a plan view of a vessel illustrating the various operating components diagrammatically.

The programmable logic control 20 is also viewed in FIGS. 3A and 3B with interposing relays 35 which operate from the output of the programmable logic controller 20, motorized circuit breakers 21, 22, 23, 24, 25 and safety related interlocks generally illustrated at 36, all of which is intended to prevent undesired simultaneous interconnection of the two loads, generators and/or power sources as will be described.

OPERATION

In operation, it will initially be assumed that the vessel 63 is at shore; that is, it will not be powered by a shipboard generator and, rather, from a shore based power source, the first power source being the port shore power source 71 and the second power source being the starboard shore power source 72. Each of the shore based power sources 71, 72 is connected to the vessel by couplers or plugs 60, 61.

It will also initially be assumed that there is power being supplied by only the port shore power source 71 and that the starboard shore power source 72 is not being used. In such event, control button 11 will be pressed inwardly to allow the power to pass through breaker 21 and, thereby to load A 73. Since there is power only being supplied by one power source, tie breaker 23 will be closed thereby allowing such power to be provided to both load A 73 and load B 74.

If the loading is such that a second power source is required, that is, that starboard shore power source 73 is required, starboard shore control button 13 will be pressed. The two loads will immediately become isolated because the programmable logic controller 20 will open tie breaker 23. Thus, port shore power source 71 will supply load A 73 and starboard shore power source 72 will supply load B., port shore breaker 21 and starboard shore breaker 24 being closed to allow such power to supply both load A 73 and load B 74.

It will next be assumed that the vessel 70 is no longer supplied by shore power and, rather, it is being supplied only by the port generator 81. In this event, the operation will be identical to that in association with the supply by port shore power source 71; that is, tie breaker 23 will be closed and the power from port generator 81 will be supplied to both load A 73 and load B 74.

In the event that additional power is required, the operation of starboard generator 81 will be initiated and starboard generator control 13 will be closed. The programmable logic controller 20 will immediately open tie breaker 23 thereby isolating load A 73 from load B 74. Each generator will thereafter supply its own load; that is, port generator 80 will supply load A 73 and starboard generator 81 sill supply starboard load 74.

The use of the motorized circuit breakers 21, 22, 23, 24, 25 with a split loading system described is advantageous in that the electrical contactors are disposed of which enhances safety. If a motorized breaker opens thereby isolating the associated generator, the remaining generator will remain on line and supply the two loads after the tie breaker 23 is closed. Of course, if the loading is such that a single generator is not sufficient, the loading must be reduced.

In the event of the failure of the programmable logic controller 20 which will then lead to a failure to open or close the motorized circuit breaker bank 30, the individual circuit breakers may be manually controlled. Care must be taken to ensure that the tie breaker 23 is in its appropriate position depending on the power sources being utilized.

While only a single control pad has been described, it will be apparent that a plurality of key pads or control panels could be located at other locations on the vessel. For example, a keypad could be located in the engine room and a further control panel or keypad could be located on the flying bridge in addition to being located in the wheelhouse and engine room.

In order to bring the second generator on line, it would be possible to automatically do so such that when the capacity of the first generator reaches, say, 90% capacity, the second generator could be brought on line automatically. Alternatively, a power meter to monitor the power being utilized by the first generator could be positioned adjacent to a keypad. When the power meter indicated that the generator was at, say, 90% capacity, the operator could merely manually bring the second generator on line and provide the necessary load control through the apparatus disclosed and claimed.

The safety interlocks 36 (FIG. 3B) use auxiliary contacts on the breakers and are used to prevent the breakers from being closed when desired such that the generators are never interconnected when being operated and servicing a respective load.

While specific embodiments of the invention have been described, such description should be taken as illustrative of the invention only and not as limiting its scope as defined in accordance with the accompanying claims.

I claim:

1. Vessel load management system comprising a control panel, a first and a second load, a first and second generator operable to supply power to said first and second loads and first and second motorized circuit breakers interposed between said control panel and said first and second generators and a third motorized circuit breaker operably interposed between said first and second loads, said third motorized circuit breaker being operable to isolate said first generator supplying power to said first load and said second generator supplying power to said second load.

2. Vessel load management system as in claim 1 and further including a programmable logic controller interposed between said control panel and said first, second and third motorized circuit breakers.

3. Vessel load management system as in claim 2 and further comprising first coupling means between said first and second loads and a first power source.

4. Vessel load management system as in claim 3 and further comprising a fourth motorized circuit breaker interposed between said programmable logic controller and said first coupling means.

5. Vessel load management system as in claim 4 and further comprising a second coupling means between said first and second loads and a second power source.

6. Vessel load management system as in claim 5 and further comprising a fifth motorized circuit breaker interposed between said programmable logic controller and said second coupling means.

7. Method of managing the electrical load of a vessel comprising providing power to a first and second load from a first and second power source, controlling the distribution of said first and second loads to said first and second power sources and isolating said first and second loads when said power is being provided to said first and second loads simultaneously by said first and second power sources.

8. Method of managing the electrical load of a vessel as in claim 7 wherein said first power source is a first generator and said second power source is a second generator, said first generator being isolated from said second generator by a motorized circuit breaker.

* * * * *